(12) United States Patent
David et al.

(10) Patent No.: US 11,569,497 B2
(45) Date of Patent: Jan. 31, 2023

(54) LIQUID PROCESS FOR PREPARING A VANADIUM PHOSPHATE-CARBON COMPOSITE MATERIAL

(71) Applicants: Centre national de la recherche scientifique, Paris (FR); UNIVERSITE DE PICARDIE JULES VERNE, Amiens (FR)

(72) Inventors: Rénald David, Fresnoy Au Val (FR); Christine Surcin, Thieulloy (FR); Mathieu Morcrette, Amiens (FR)

(73) Assignees: CENTRE NATIONAL DE LA RECHERCHE SCIENTIFIQUE, Paris (FR); UNIVERSITE DE PICARDIE JULES VERNE, Amiens (FR)

( * ) Notice: Subject to any disclaimer, the term of this patent is extended or adjusted under 35 U.S.C. 154(b) by 69 days.

(21) Appl. No.: 16/481,705

(22) PCT Filed: Feb. 1, 2018

(86) PCT No.: PCT/FR2018/050248
§ 371 (c)(1),
(2) Date: Jul. 29, 2019

(87) PCT Pub. No.: WO2018/142082
PCT Pub. Date: Aug. 9, 2018

(65) Prior Publication Data
US 2019/0393492 A1 Dec. 26, 2019

(30) Foreign Application Priority Data
Feb. 1, 2017 (FR) .................................... 17 50832

(51) Int. Cl.
*H01M 4/36* (2006.01)
*C01B 25/37* (2006.01)
(Continued)

(52) U.S. Cl.
CPC ........... *H01M 4/366* (2013.01); *C01B 25/372* (2013.01); *C01B 25/455* (2013.01); *H01M 4/587* (2013.01);
(Continued)

(58) Field of Classification Search
CPC .................................................... C01B 25/372
See application file for complete search history.

(56) References Cited

U.S. PATENT DOCUMENTS

2002/0192553 A1  12/2002  Barker et al.
2011/0210288 A1*  9/2011  Barker .................... C01B 25/45
                                                    252/182.1
2018/0297847 A1  10/2018  Hall et al.

FOREIGN PATENT DOCUMENTS

CN  103594716 A  2/2014
CN  102774821 B  5/2014
(Continued)

OTHER PUBLICATIONS

Guo et al. English machine translation of CN 102774821 A (Year: 2014).*
(Continued)

*Primary Examiner* — Peter F Godenschwager
(74) *Attorney, Agent, or Firm* — Pearne & Gordon LLP

(57) ABSTRACT

The invention relates to a process for the preparation of a vanadium-carbon phosphate composite material, a vanadium-carbon phosphate composite material obtained according to the process, and to the uses of the composite material, especially as a precursor for the synthesis of electrochemically-active materials, electrode or active anode material.

26 Claims, 6 Drawing Sheets

(51) Int. Cl.

| | | |
|---|---|---|
| *C01B 25/455* | (2006.01) | |
| *H01M 4/58* | (2010.01) | |
| *H01M 4/587* | (2010.01) | |
| *H01M 4/62* | (2006.01) | |
| *H01M 4/02* | (2006.01) | |

(52) U.S. Cl.
CPC ......... *H01M 4/5825* (2013.01); *H01M 4/622* (2013.01); *C01P 2002/72* (2013.01); *C01P 2002/74* (2013.01); *C01P 2002/77* (2013.01); *C01P 2004/04* (2013.01); *C01P 2004/80* (2013.01); *C01P 2006/40* (2013.01); *H01M 2004/027* (2013.01)

(56) References Cited

FOREIGN PATENT DOCUMENTS

| CN | 103872324 B | 8/2016 |
|---|---|---|
| JP | 2004533706 A | 11/2004 |
| WO | 02097907 A2 | 12/2002 |
| WO | 2017064189 A1 | 4/2017 |

OTHER PUBLICATIONS

Search Report and Written Opinion for French Application No. 17 50832 dated Oct. 30, 2017.

International Search Report for PCT/FR2018/050248 dated May 9, 2019.

Jun-Chao Zheng et al, "Electrochemical Properties of VPO 4/C Nanosheets and Microspheres As Anode Materials for Lithium-Ion Batteries", ACS Applied Materials & Interfaces, vol. 6, No. 9, May 14, 2014 (May 14, 2014), pp. 6223-6226, XP055389730, US, ISSN: 1944-8244, DOI: 10.1021/am5016638.

Xihui Nan et al., "Amorphous VP04/C with the enchanced performances as an anode for lithium ion batteries", Journal of Materiomics, vol. 2, No. 4, Nov. 2, 2016 (Nov. 2, 2016), pp. 350-357, XP055389725, ISSN: 2352-8478, DOI: 10.1016/j.jmat.2016.10.001.

Zhang Y, et al., "Core-shell VP04/C anode materials for Li ion batteries: Computational investigation and solgel synthesis", Journal of Alloys and Compounds, Elseviersequoia, Lausanne, CH, vol. 522, Jan. 25, 2012 (Jan. 25, 2012), pp. 167-171, XP 028464563; ISSN: 0925-8388, Doi: 10.1016/J.JALLCOM.2012.01.143.

* cited by examiner 10a 10b

LIQUID PROCESS FOR PREPARING A VANADIUM PHOSPHATE-CARBON COMPOSITE MATERIAL

CROSS-REFERENCE TO RELATED APPLICATIONS

This is the National Stage of PCT international application PCT/FR2018/050248, filed on Feb. 1, 2018, which claims the priority of French Patent Application No. 17 50832, filed Feb. 1, 2017, both of which are incorporated herein by reference in their entirety.

The invention relates to a process for the preparation of a vanadium phosphate-carbon composite material, to a vanadium phosphate-carbon composite material obtained according to said process, and to the uses of said composite material, in particular as precursor for the synthesis of electrochemically-active electrode materials or as active anode material.

It applies, in particular, to the field of lithium-ion or sodium-ion batteries, in which there is a growing demand for active electrode materials that can be obtained according to a simple and economical process, while ensuring good electrochemical performance.

A lithium battery (respectively a sodium battery) comprises at least one negative electrode and at least one positive electrode between which is placed a solid electrolyte or a separator impregnated with a liquid electrolyte. For example, the liquid electrolyte may consist of a lithium salt (or a sodium salt) dissolved in a solvent chosen to optimize the transport and dissociation of the ions. The positive electrode is constituted by a current collector supporting an electrode material which contains at least one positive electrode active material capable of inserting lithium ions (respectively sodium ions) in a reversible manner; the negative electrode consists of a sheet of lithium (respectively sodium) metal (optionally supported by a current collector), a lithium (respectively sodium) alloy or an intermetallic lithium (respectively sodium) compound (lithium battery) (respectively sodium battery), or by a current collector supporting an electrode material which contains at least one negative electrode active material capable of inserting lithium ions (respectively sodium ions) in a reversible manner (lithium ion battery: Li-ion) (respectively sodium ions: Na-ion). Each electrode material generally further comprises a polymer which acts as a binder (e.g. polyvinylidene fluoride or PVF) and/or an agent conferring electronic conductivity (e.g. carbon) and/or a compound conferring ion conduction (e.g. lithium salt) (e.g. respectively sodium salt).

During operation of the battery, lithium ions (respectively sodium ions) pass through the electrolyte from one to the other of the electrodes. During discharge of the battery, a quantity of lithium (respectively sodium) reacts with the positive electrode active material from the electrolyte, and an equivalent amount is introduced into the electrolyte from the negative electrode active material, the concentration of lithium (respectively sodium) thus remaining constant in the electrolyte. The insertion of lithium (respectively sodium) into the positive electrode is compensated by supplying electrons from the negative electrode via an external circuit. During charging, the reverse phenomena take place.

Several methods are known for preparing a material based on vanadium phosphate and carbon. For example, Zhang et al. [*J. Alloys and Compounds*, 2012, 522, 167-171] have described a sol-gel process for forming a composite material comprising vanadium phosphate coated with an amorphous carbon film of about 8 nm thickness. More particularly, $V_2O_5$ and oxalic acid in stoichiometric amounts are dissolved in water with stirring for 1 hour at 70° C. Then, $NH_4H_2PO_4$ in stoichiometric amounts is added to the above mixture at 70° C. and the resulting mixture is held at 70° C. for 4 h until a gel forms. The gel obtained is then dried at 100° C. for 12 h to form a powder which is pressed into the form of pellets. The pellets are then heated to 350° C. for 4 h under argon, and glucose is comminuted with the pellets as a carbon source. The resulting mixture is finally calcined at 750° C. for 12 h under argon. However, this type of process comprises a large number of steps and remains very long. Furthermore, the intimate comminution step between the vanadium phosphate precursor and the glucose is critical to obtaining a homogeneous carbon coating. Finally, this process uses $NH_4H_2PO_4$ which produces ammonia, making it difficult to industrialize.

In addition, Barker et al. described in US2002/0192553 the carbothermic reduction of $V_2O_5$ in the presence of $NH_4H_2PO_4$ and acetylene black at 300° C. for 3 h in air, the cooling of the resulting mixture, its comminution, then its calcination at 750° C. for 8 h under argon. The use of excess carbon leads to a material comprising vanadium phosphate and carbon. However, the material is in the form of micrometric granules of carbon mixed with micrometric vanadium phosphate grains. It therefore has electrochemical performances which are not optimized (see Example 4 as described below). An alternative to carbothermic reduction is the use of dihydrogen as a reducing agent. In particular, a mixture of $V_2O_5$ and $NH_4H_2PO_4$ is heated to 300° C. for 8 h under dihydrogen, cooled, comminuted and then heated to 850° C. for 8 h under dihydrogen. However, the vanadium phosphate must then be contacted with a carbon source such as glucose in an additional step. In addition, $NH_4H_2PO_4$ releases nitrous oxide under a reducing atmosphere which deteriorates the walls of the apparatus/reactors used. Finally, the comminution or mechanosynthesis steps used in the aforementioned methods are expensive.

The hydrothermal route has also been proposed to produce a material based on vanadium phosphate and possibly carbon. However, this route requires the use of very high pressures and/or an autoclave that increase the cost of production.

The object of the present invention is therefore to overcome all or part of the disadvantages of the aforementioned prior art, and, in particular, to provide a simple and inexpensive process (e.g. which has few steps) for the preparation of a composite material based on vanadium phosphate and carbon, while avoiding the release of harmful gases such as ammonia.

Figure 1:
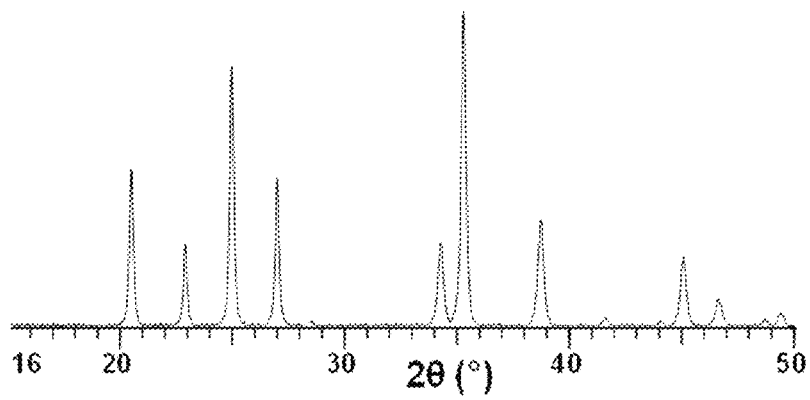
FIG. 1 represents an X-ray diffraction diagram of the composite material 1 of formula $VPO_4/C$.

The invention therefore firstly relates to a method for preparing a vanadium phosphate-carbon composite material having the formula $VPO_4/C$, characterized in that it comprises the following steps:

i) mixing a vanadium precursor, $H_3PO_4$, a compound A selected from a compound comprising at least one carboxylic acid function (compound $A_1$) and a polysaccharide compound (compound $A_2$), in an aqueous solvent, it being understood that when the compound comprising at least one carboxylic acid function (compound $A_1$) is different from a carbon precursor, the mixture further comprises a carbon precursor compound (compound B), ii) heating the mixture of step i) to a temperature of about 35° C. to 100° C., to form a solid residue, and iii) heating the solid residue to a temperature above about 850° C.

Thus, the process of the invention allows in a few steps and economically, the directly formation of a vanadium phosphate-carbon composite material, while avoiding the release of harmful gases such as ammonia.

Step i) is generally carried out at a temperature of from 15 to 30°, and preferably from 20 to 25° C. (i.e. room temperature).

It makes it possible to form an aqueous suspension comprising the vanadium precursor, $H_3PO_4$ (as phosphate precursor), the compound A chosen from the compound comprising at least one carboxylic acid function and the polysaccharide compound, and optionally the carbon precursor compound.

The aqueous solvent is preferably water, especially distilled water.

The vanadium precursor is preferably $V_2O_5$.

The molar ratio [$H_3PO_4$/vanadium element in the vanadium precursor] generally varies from about 1 to 1.5.

The mass concentration of vanadium precursor (e.g. $V_2O_5$) in the aqueous suspension at the end of step i) varies from about 0.1% to 25% by weight, and preferably from about 0.5 to 15% by weight.

In the process, the compound comprising at least one carboxylic acid function (compound $A_1$) acts as a chelating agent. In addition, the compound $A_1$ or the carbon precursor compound (compound B) will make it possible to form a layer of carbon enveloping the $VPO_4$ particles.

The compound comprising at least one carboxylic acid function (compound $A_1$) may be identical to or different from a carbon precursor. When the compound comprising at least one carboxylic acid function (compound $A_1$) is also a carbon precursor, it plays both the role of chelating agent and carbon precursor. The addition of a carbon precursor compound is therefore not necessary. When the compound comprising at least one carboxylic acid function (compound $A_1$) is not a carbon precursor, a carbon precursor compound (compound B) must be used.

In the process, the polysaccharide compound (compound $A_2$) has the advantage of acting both as a chelating agent and a carbon precursor.

According to a particularly preferred embodiment of the invention, the compound comprising at least one carboxylic acid function (compound $A_1$) is a polycarboxylic acid, while, more preferably, it comprises two or three carboxylic acid functions.

In a particular embodiment, the compound comprising at least one carboxylic acid function (compound $A_1$) comprises from 2 to 10 carbon atoms, and preferably from 2 to 6 carbon atoms.

The compound comprising at least one carboxylic function (compound $A_1$) may also contain one or more hydroxyl functional groups, especially in the α-position of a carboxylic acid function.

The compound comprising at least one carboxylic acid function (compound $A_1$) may be chosen from saturated carboxylic or polycarboxylic acids such as oxalic acid, citric acid, glycolic acid, lactic acid, tartaric acid, malic acid, succinic acid, glycolic acid, malonic acid, glutaric acid, adipic acid, isocitric acid, oxalosuccinic acid, tricarballylic acid and unsaturated carboxylic or polycarboxylic acids such as maleic acid, fumaric acid and aconitic acid.

Saturated carboxylic or polycarboxylic acids are preferred.

The molar ratio [compound comprising at least one carboxylic acid function (compound $A_1$)/vanadium element in the vanadium precursor] is generally at least 1, and preferably varies from 1 to about 2, and more preferably from about 1.02 to 1.5. This makes it possible to optimize the electrochemical performance.

The molar ratio [polysaccharide compound (compound $A_2$)/vanadium element in the vanadium precursor] is generally at least 0.01, and preferably ranges from about 0.1 to about 0.6. This makes it possible to optimize the electrochemical performance.

The carbon precursor compound (compound B) may be a polyol such as a diol or a triol.

According to a particularly preferred embodiment of the invention, the carbon precursor compound (compound B) is chosen from ethylene glycol and glycerol.

The molar ratio (carbon precursor compound (compound B)/vanadium element in the vanadium precursor) preferably varies from approximately 0.05 to 2, and more preferably from approximately 0.25 to 0.45.

The polysaccharide compound (compound $A_2$) may be chosen from polysaccharides comprising agarose and/or agaropectin and carrageenates.

According to a particularly preferred embodiment of the invention, the polysaccharide compound (compound $A_2$) is a polysaccharide comprising agarose and/or agaropectin such as agar-agar.

According to a particularly preferred embodiment of the invention, the mixture of step i) comprises either citric acid (as a compound comprising at least one carboxylic acid function) or oxalic acid (as a compound comprising at least one carboxylic acid function) and ethylene glycol or glycerol (as a carbon precursor compound), or agar-agar (as a polysaccharide compound).

Step i) generally lasts from about 1 to 60 minutes.

Step i) is preferably a mechanical mixture.

The mixture of step i) may also comprise a polyol such as a diol or a triol, especially when the compound A is a compound comprising at least one carboxylic acid function (compound $A_1$) which is a carbon precursor, or a polysaccharide compound (compound $A_2$).

The polyol may be chosen from ethylene glycol and glycerol.

The mixture of step i) may further comprise a binder.

The binder may make it possible to avoid the increase in volume during the implementation of the process of the invention, and thus can freeze the system, making it easily industrializable.

The binder may be chosen from synthetic polymers such as polyvinyl alcohol, polyethylene glycol, polyvinylpyrrolidone, polyacrylonitrile, polyformaldehyde, polylactic acid or polyitaconates; biopolymers such as polysaccharides, polysaccharide derivatives or polypeptides; and one of their mixtures.

As an example of polysaccharides, mention may be made, in particular, of agar-agar, especially when the compound $A_1$ is used. When a binder is used, the proportion of binder in the solid mixture of step i) preferably ranges from about 0% to about 50% by weight, and more preferably from about 10% to about 30% by weight.

The solid mixture does not take into account the aqueous solvent. It therefore comprises the vanadium precursor, $H_3PO_4$, the compound $A_1$ or $A_2$, and the compound B if it exists.

Above a proportion of 50%, the electrochemical performances are reduced, in particular by a decrease in the ionic conductivity and/or the specific energy density.

Step ii) makes it possible to evaporate the aqueous solvent to form a solid residue.

Step ii) is generally conducted under air, in particular using a hot plate.

In a particular embodiment, step ii) lasts from approximately 1 h to 12 h.

Step ii) is preferably carried out with magnetic stirring.

Steps i) and ii) may be concomitant.

Step iii) preferably lasts at least about 30 min, and more preferably at least about 1 h.

In a particular embodiment, step iii) lasts not more than about 8 h, preferably not more than about 5 h, and more preferably not more than about 3 h.

In fact, this maximum duration makes it possible to avoid the formation of by-products such as vanadium phosphite (VP).

Step iii) is preferably carried out at a temperature greater than 860° C., more preferably from about 870° C. to 910° C., and more preferably from about 880° C. to about 900° C.

Step iii) may be carried out under argon or under air.

Step iii) may be implemented in a closed or open container.

The process may further comprise a step iv) in which the composite material obtained at the end of step iii) is cooled, especially to room temperature (i.e. about 20-25° C.).

Step iv) may be carried out using water, and preferably cold water (cold water temperature below room temperature, e.g. below about 20-25° C.).

Preferably, the process does not include comminution steps and/or mechanosynthesis (well known as "ball milling").

The process may further comprise step ii') between steps ii) and iii) during which the solid residue is heated to a temperature of about 200 to 400° C., in particular for a period of about 30 min to about 2 h.

This step ii') may be carried out in an oven.

Step ii') may make it possible to contain a possible volume increase in an open environment.

Preferably, the process does not include heating steps other than steps ii), ii') and iii).

Preferably, the process does not involve the implementation of high pressures (e.g. pressures of the order of 3 bars) and/or the use of an autoclave.

The second object of the invention is a vanadium phosphate-carbon composite material, characterized in that it is obtained according to a process according to the first object of the invention.

In particular, the composite material of the invention comprises $VPO_4$ particles coated with an amorphous carbon layer.

The vanadium phosphate-carbon composite material of the invention has the advantage of leading to electrochemically-active electrode materials which exhibit improved electrochemical performance compared with those obtained from a vanadium phosphate-carbon composite material of the prior art.

The invention therefore has for its third object the use of a vanadium phosphate-carbon composite material as obtained according to the process according to the first object of the invention as a precursor for the preparation of electrochemically-active electrode materials and, in particular, active materials of polyanionic type cathodes such as $Na_3V_2(PO_4)_2F_3/C$, $Na_3V_2(PO_4)_3/C$ or $LiVPO_4F/C$.

The fourth subject of the invention is the use of a vanadium phosphate-carbon composite material as obtained according to the process according to the first object of the invention as anode active material.

The invention has for its fifth object a composite material of formula $Na_3V_2(PO_4)_2F_3/C$, characterized in that it is obtained from a vanadium phosphate-carbon composite material of formula $VPO_4/C$ according to the second object of the invention or obtained according to a process according to the first object of the invention.

The composite material preferably has the following lattice parameters: a=9.0294(2) Å, b=9.0445(2) Å, c=10.7528(2) Å in the Amam crystalline system.

The $Na_3V_2(PO_4)_2F_3/C$ composite material of the invention has a higher Vanadium III/Vanadium IV molar ratio than the composite materials of the prior art. This allows improved electrochemical performance to be obtained. This upper molar ratio is preferably translated by a lattice parameter c greater than or equal to 10.752 Å.

Furthermore, the inventors have surprisingly found that the composite material $Na_3V_2(PO_4)_2F_3/C$ of the invention has a tamped density higher than that of composite materials of the prior art. The tamped density is preferably measured using a volumetric device, in particular a volumeter sold under the trade name STAV II by the company J. Engelsmann A G, preferably with the following parameters: volume of 250 ml and 1250 jolts.

The tamped density is obtained according to the conditions of the European Pharmacopoeia, DIN ISO 787 Part 11, ISO 3953, and ASTM B 527-93.

The tamped density of the $Na_3V_2(PO_4)_2F_3$/C composite material of the invention is preferably greater than about 0.5 g/cm$^3$, and preferably greater than about 1 g/cm$^3$.

According to a particularly preferred embodiment of the invention, the tamped density of the composite material $Na_3V_2(PO_4)_2F_3$/C varies from about 0.5 to 3.16 g/cm$^3$, and more preferably from about 1 to 2 g/cm$^3$.

The sixth object of the invention is a composite material of formula $Na_3V_2(PO_4)_2F_3$/C, characterized in that it has the following lattice parameters: a=9.0294(2) Å, b=9.0445(2) Å, c=10,7528(2) Å in the Amam crystalline system.

This composite material may be obtained from a vanadium phosphate-carbon composite material of formula $VPO_4$/C according to the second object of the invention or obtained by a process according to the first object of the invention.

EXAMPLES

The raw materials used in the examples are listed below:
$H_3PO_4$, Alfa Aesar, 85% in water,
$V_2O_5$, Alfa Aesar, 99.2%,
citric acid, Alfa Aesar, 99+%,
oxalic acid, Sigma Aldrich, 98%,
ethylene glycol, Fluka, >99.5%,
agar-agar, Fisher BioReagents, BP2641-1
$Na_3PO_4$, Acros Organic, pure anhydrous,
NaF, Sigma Aldrich, >99%,
distilled water, and
argon 5.0, Messer.

Unless otherwise specified, all materials were used as received from the manufacturers.

Example 1

Preparation of a Composite Material 1 of the $VPO_4$/C Formula According to the Process According to the Invention 4.04 g of vanadium oxide ($V_2O_5$), 5.12 g of phosphoric acid ($H_3PO_4$), 4.2 g of oxalic acid and 0.9 g of ethylene glycol were mixed in a beaker with 20 ml of distilled water.

The resulting mixture was heated to 85° C. with magnetic stirring for 12 h to evaporate the water. The resulting residue was heated to 890° C. for 1 h in a quartz tube under an argon atmosphere.

The tube was then cooled to room temperature using water.

The composite material 1 obtained in the form of a powder was analyzed by X-ray diffraction (XRD) using a diffractometer sold under the trade name D8 by Bruker (CuKα radiation). The samples were scanned between 16 and 50° 2θ.

FIG. 1 represents an X-ray diffraction diagram of the composite material 1 of formula $VPO_4$/C.

All the diffraction peaks of FIG. 1 were indexed in the Cmcm crystal system with the following lattice parameters: a=5.2399(4) Å, b=7.7886(6) Å, and c=6.2956(4) Å, which is consistent with the description given by Glaum et al. [*Zeitschrift fuer Kristallographie* (1979-2010), 1992, 198, 41-47].

The amount of carbon in the composite material 1 of the formula $VPO_4$/C was analyzed by thermogravimetric analysis (TGA). A heating rate of about 10° C. per minute was used from about 25° C. to about 680° C. and a step at 680° C. for 1 hour was performed. The composition of the gas phase was monitored in parallel with mass spectroscopic (MS) heating. It was approximately 4.8% by weight, based on the total weight of composite material.

The composite material 1 was also analyzed by transmission electron microscopy (TEM) using a microscope sold under the trade name FEI TECNAI G2 by the company FEI.

Figure 2:
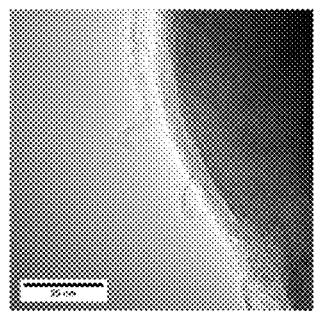
FIG. 2 represents a TEM image of the composite material 1.

FIG. 2 represents a TEM image of the composite material 1. It confirms the presence of a carbon shell with a thickness of about 5 nm, enveloping the vanadium phosphate.

Example 2

Preparation of a Composite Material 2 of the $VPO_4$/C Formula According to the Process According to the Invention 4.04 g of vanadium oxide ($V_2O_5$), 5.12 g of phosphoric acid ($H_3PO_4$) and 5.6 g of citric acid were mixed in a beaker with 20 ml of distilled water.

The resulting mixture was heated to 85° C. with magnetic stirring for 12 h to evaporate the water. The resulting residue was heated to 890° C. for 1 h in a quartz tube under an argon atmosphere.

The tube was then cooled to room temperature using water.

The composite material 2 obtained in the form of a powder was analyzed by X-ray diffraction (XRD) using an apparatus as described in Example 1. The samples were scanned between 16 and 50° 2θ.

The X-ray diffraction pattern of the composite material 2 of the formula $VPO_4$/C was similar to that obtained for the composite material of Example 1 (see FIG. 1).

The TEM image of the composite material 2 of the formula $VPO_4$/C was similar to that obtained for the composite material of Example 1 (see FIG. 2.

The amount of carbon in the composite material 2 of the formula $VPO_4$/C was analyzed by ATG as in Example 1. It was 4.5% by weight approximately, relative to the total mass of composite material.

Comparative Example 3

Preparation of a Material A According to a Method not in Accordance with the Invention 4.04 g of vanadium oxide ($V_2O_5$), 5.12 g of phosphoric acid ($H_3PO_4$), 4.2 g of oxalic acid and 0.9 g of ethylene glycol were mixed in a beaker with 20 ml of distilled water.

The resulting mixture was heated to 85° C. with magnetic stirring for 12 h to evaporate the water. The resulting residue was heated to 850° C. for 10 h in a quartz tube under an argon atmosphere.

The tube was then cooled to room temperature using water.

The material A obtained in the form of a powder was analyzed by X-ray diffraction (XRD) using an apparatus as described in Example 1. The samples were scanned between 20 and 40° 2θ.

Figure 3:
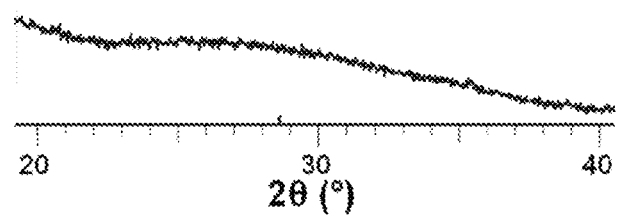
FIG. 3 represents an X-ray diffraction pattern of material A.

FIG. 3 represents an X-ray diffraction pattern of material A, showing an amorphous material very different from composite materials 1 and 2 respectively obtained in Examples 1 and 2.

Example 4

Use of a Composite Material of Formula $VPO_4$/C Obtained According to a Process According to the Invention as a Precursor for the Preparation of Eelectrochemically-Active Electrode Materials 4.1 Preparation of $Na_3V_2(PO_4)_2F_3$/C 4 g of a composite material of formula $VPO_4$/C as obtained in Example 1 were mixed with 1.22 g of NaF for 12 h using a Turbula-type space mixer comprising a ball. Then, the resulting mixture was heated to 700° C. for 1 h in a quartz tube under an argon atmosphere. The tube was then cooled to room temperature using water.

The composite material 3 of formula $Na_3V_2(PO_4)_2F_3$/C obtained in the form of a powder was analyzed by X-ray diffraction (XRD) using an apparatus as described in Example 1. The samples were scanned between 16 and 50° 2θ. The Rietveld model was used to refine the lattice parameters of the materials.

Figure 4:
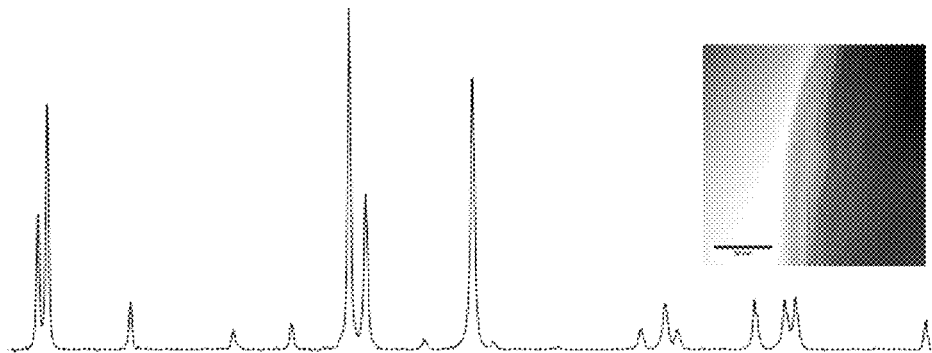
FIG. 4 represents an X-ray diffraction pattern of the composite material 3 of formula $Na_3V_2(PO_4)_2F_3/C$, as well as a TEM image of the composite material 3.

FIG. 4 represents an X-ray diffraction pattern of the composite material 3 of formula $Na_3V_2(PO_4)_2F_3$/C, as well as a TEM image of said composite material 3.

All the diffraction peaks of FIG. 4 were indexed in the Amam crystaline system with the following lattice parameters: a=9.0294(2) Å, b=9.0445(2) Å, c=10.7528(2) Å, which is in agreement with the description given by Bianchini et al. [*Chem. Mater.*, 2015, 27, 8, 3009-3020].

The tamped density of the composite material $Na_3V_2(PO_4)_2F_3$/C was about 1.3 g/cm$^3$, measured using a volumeter sold under the trade name STAV II by the company J. Engelsmann A G with the following parameters: volume of 250 ml (ISO 787) and 1250 jolts.

For comparison, a composite material B of formula $Na_3V_2(PO_4)_2F_3$/C was prepared from a $VPO_4$/C obtained according to the method of Barker et al. [US2002/0192553, carbothermic reduction, Example 1(a)].

To this end, 5.40 g of $V_2O_5$, 6.83 g of $NH_4H_2PO_4$ and 0.76 g of SP carbon were mixed, comminuted and converted into granules. Then the granules were heated in an oven under air up to 300° C. (temperature rise of 2° C. per minute) then the heating was maintained at 300° C. for 3 h and then at 800° C. for 8 h. The resulting mixture was cooled to room temperature. A $VPO_4$/C black powder was thus obtained. The composite material B of formula $Na_3V_2(PO_4)_2F_3$/C was prepared from this $VPO_4$/C according to the same procedure as that described to produce the composite material 3.

The composite material 3 was analyzed from the point of view of its electrochemical performance and compared to the composite material B.

To do this, electrochemical tests were performed using cells of the button cell type. The electrodes in the form of a film were made in air from formulated inks comprising 87.1% by weight of active material (i.e. composite material 3 or B), 7.7% by weight of carbon and 5.2% by weight of PVF. The button cells were assembled in a glove box. The electrochemical cell included:

an electrode film comprising the active material (i.e. composite material 3 or B), as a positive electrode, a sodium sheet, as a negative electrode, Whatman GF/D category 1823070 glass fibers, as a separator interposed between the positive and negative electrodes, and a solution comprising a sodium salt $NaPF_6$ (approximately 1 mol/l) dissolved in a mixture of ethylene carbonate/dimethyl carbonate (ratio 1/1 by weight), and 3% by weight of fluoroethylene carbonate, of liquid electrolyte.

Figure 5:
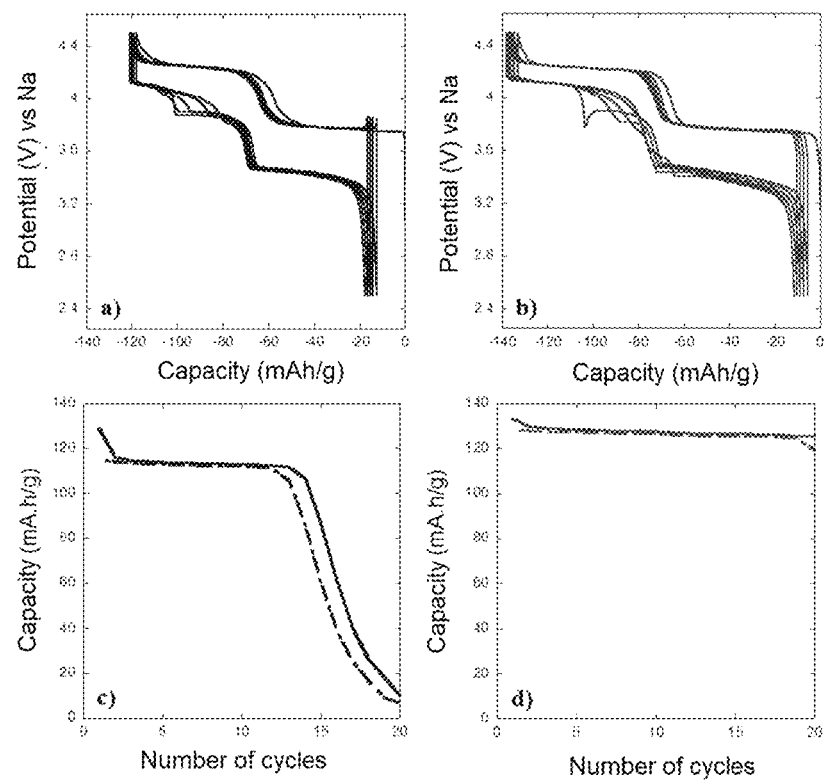
FIG. 5 clearly shows a good stability of the cycle when the active material is prepared from the composite material obtained according to the method of the invention.

FIG. 5 shows the curve of the potential vs Na (in volts) as a function of the capacity (in mAh/g) with a current regime of 1 Na exchanged per hour of the composite material B (portion (a) of (FIG. 5) and the composite material 3 (portion (b) of FIG. 5) and the capacitance curve (in mAh/g) as a function of the number of cycles of the composite material B (portion (c) of FIG. 5) and the composite material 3 (portion (d) of FIG. 5).

FIG. 5 clearly shows a good stability of the cycle when the active material is prepared from the composite material obtained according to the method of the invention.

4.2 Preparation of $Na_3V_2(PO_4)_3$/C 4 g of $VPO_4$ as obtained in Example 1 were mixed with 1.59 g of $Na_3PO_4$ for 12 h using a Turbula-type space mixer comprising a ball. Then, the resulting mixture was heated to 810° C. for 1 h in a quartz tube under an argon atmosphere.

The tube was then cooled to room temperature using water.

The composite material 4 of formula $Na_3V_2(PO_4)_3$/C obtained in the form of a powder was analyzed by X-ray diffraction (XRD) using an apparatus as described in Example 1. The samples were scanned between 16 and 50° 2θ.

Figure 6:
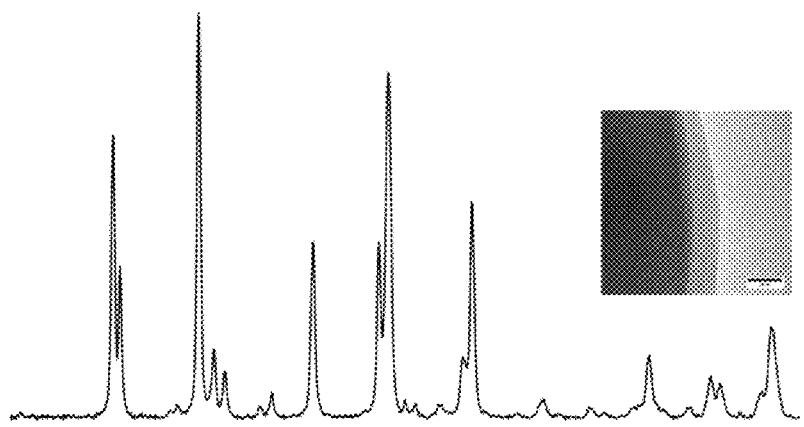
FIG. 6 represents an X-ray diffraction diagram of the composite material 4 of formula $Na_3V_2(PO_4)_3/C$, as well as a TEM image of the composite material 4.

FIG. 6 represents an X-ray diffraction diagram of the composite material 4 of formula $Na_3V_2(PO_4)_3$/C, as well as a TEM image of said composite material 4.

All the diffraction peaks of FIG. 6 were indexed in the R-3c crystaline system with the following lattice parameters: a=8.7217(2) Å, b=8.7217(2) Å and c=21.8485(7) Å, which is consistent with the description given by Zatovsky et al. [*Acta Crystallographica*, Section E., Structure Reports Online, 2010, 66, 2, pi12-pi12].

For comparison, a composite material C of formula $Na_3V_2(PO_4)_3$/C was prepared from a $VPO_4$/C obtained according to the method of Barker et al. [US2002/0192553, carbothermic reduction, Example 1 (a)]. The $VPO_4$/C was therefore prepared according to a process identical to that described in Example 4.1 above, and then the composite material C of formula $Na_3V_2(PO_4)_3$ was prepared from this $VPO_4$/C in the same manner as that described for producing the composite material 4.

The composite material 4 was analyzed from the point of view of its electrochemical performance and compared to the composite material C.

To do this, electrochemical tests were performed using cells of the button cell type. The electrodes in the form of a film were made in air from formulated inks comprising 85.5% (respectively 80%) by weight of composite material 4 (respectively by weight of composite material C), 9.8% by weight of carbon (respectively 14.2%) by weight of carbon and 4.7% (respectively 5.8%) by weight of PVF. The button cells were assembled in a glove box. The electrochemical cell comprised:

an electrode film comprising the active material (i.e. composite material 4 or C), as a positive electrode, a sodium sheet, as a negative electrode, Whatman GF/D category 1823070 glass fibers, as a separator interposed between the positive and negative electrodes, and a solution comprising a sodium salt $NaPF_6$ (approximately 1 mol/l) dissolved in a mixture of ethylene carbonate/dimethyl carbonate (ratio 1/1 by weight), and 3% by weight of fluoroethylene carbonate, of liquid electrolyte.

Figure 7:
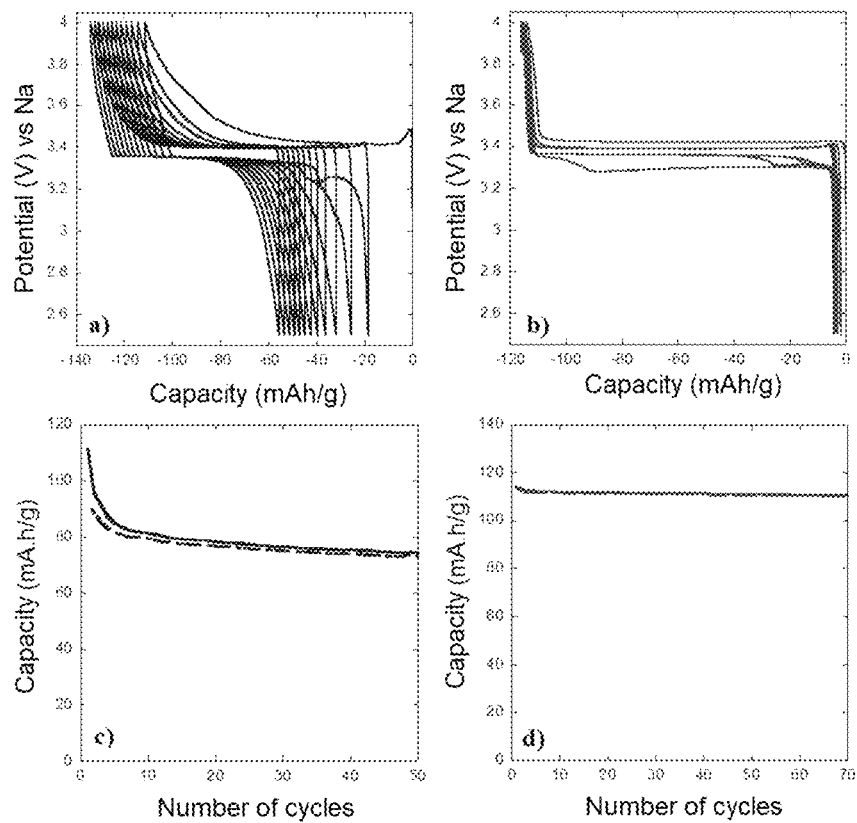
FIG. 7 shows the curve of the potential vs Na (in volts) as a function of the capacity (in mAh/g) with a current regime of C/10 of the composite material C (FIG. 7a) and of the composite material 4 (FIG. 7b) and the capacitance curve (in mAh/g) as a function of the number of cycles of the composite material C (FIG. 7c) and of the composite material 4 (FIG. 7d).

FIG. 7 shows the curve of the potential vs Na (in volts) as a function of the capacity (in mAh/g) with a current regime of C/10 of the composite material C (portion a of FIG. 7) and of the composite material 4 (portion (b) of FIG. 7) and the capacitance curve (in mAh/g) as a function of the number of cycles of the composite material C (portion (c) of FIG. 7) and of the composite material 4 (portion (d) of FIG. 7).

FIG. 7 clearly shows a good stability of the cycling when the active material is prepared from the composite material obtained according to the method of the invention.

4.3 Preparation of LiV(PO$_4$)F/C 4 g of VPO$_4$ as obtained in Example 1 were mixed with 0.68 g of LiF for 12 h using a Turbula-type space mixer comprising a ball. Then, the resulting mixture was heated to 700° C. for 1 h in a quartz tube under an argon atmosphere.

The tube was then cooled to room temperature using water.

The composite material of formula LiV(PO$_4$)F/C obtained in the form of a powder was analyzed by X-ray diffraction (XRD) using an apparatus as described in Example 1. The samples were scanned between 16 and 50° 2θ.

Figure 8:
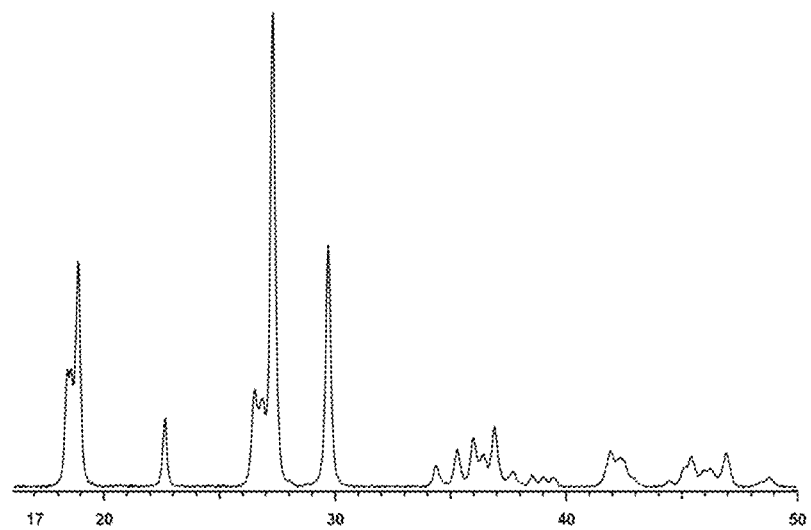
FIG. 8 represents an X-ray diffraction pattern of the composite material of formula $LiV(PO_4)F/C$, as well as a TEM image of the composite material 5.

FIG. 8 represents an X-ray diffraction pattern of the composite material of formula LiV(PO$_4$)F/C, as well as a TEM image of said composite material 5.

All the diffraction peaks of FIG. 8 were indexed in the P−1 crystalline system with the following lattice parameters: a=5,1751(5) Å, b=5,3041(4) Å, c=7, 2481(6) Å, α=107.507 (4)°, β=107.847(5)° and γ=98.450(4)°, which is consistent with the description given by Ateba Mba et al. [*Chemistry of Materials*, 2012, 24, 6, 1223-1234].

For comparison, a composite material D of formula LiV(PO$_4$)F/C_was prepared from a VPO$_4$/C obtained according to the method of Barker et al. [US2002/0192553, carbothermic reduction, Example 1(a)]. VPO$_4$/C was therefore prepared according to a process identical to that described in Example 4.1 above, and then the composite material D of formula LiV(PO$_4$)F/C_was prepared from this VPO$_4$/C according to the same procedure as that described to produce the composite material 5.

The composite material 5 was analyzed from the point of view of its electrochemical performance and compared to the composite material D.

To do this, electrochemical tests were performed using cells of the button cell type. The electrodes in the form of a film were made in air from formulated inks comprising 86.5% (respectively 87.1%) by mass of composite material 5 (respectively by weight of composite material D), 8.7% by weight of carbon (respectively 7.7%) by weight of carbon and 4.8% (respectively 5.2%) by weight of PVF. The button cells were assembled in a glove box. The electrochemical cell comprised:
  an electrode film comprising the active material (i.e. composite material 5 or C), as a positive electrode,
  a lithium sheet, as a negative electrode,
  Whatman GF/D category 1823070 glass fibers, as a separator interposed between the positive and negative electrodes, and
  a solution comprising an LiPF$_6$ sodium salt (approximately 1 mol/l) dissolved in a mixture of ethylene carbonate/dimethyl carbonate (ratio 1/1 by weight), and 3% by weight of fluoroethylene carbonate, of liquid electrolyte.

Figure 9:
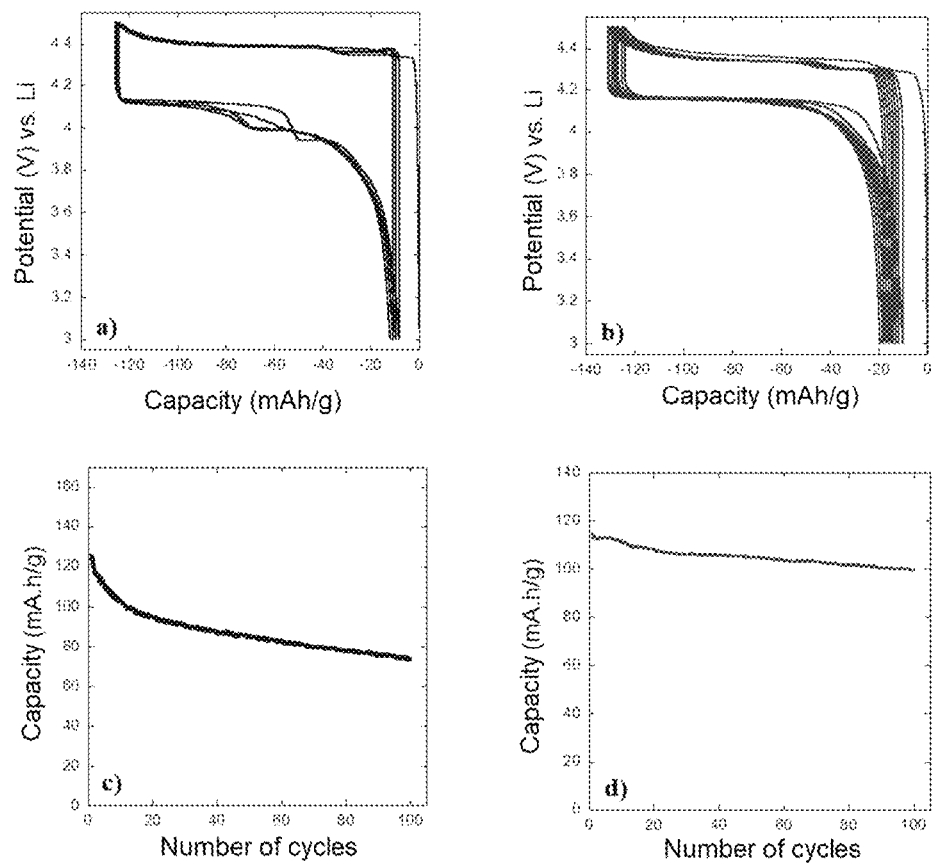
FIG. 9 shows the curve of the potential vs Li (in volts) as a function of the capacity (in mAh/g) with a current regime of C of the composite material D (FIG. 9a) and of the composite material 4 (FIG. 9b) and the capacitance curve (in mAh/g) as a function of the number of cycles of the composite material D (FIG. 9c) and of the composite material 5 (FIG. 9d).

FIG. 9 shows the curve of the potential vs Li (in volts) as a function of the capacity (in mAh/g) with a current regime of C of the composite material D (portion (a) of FIG. 9) and of the composite material 5 (portion (b) of FIG. 9) and the capacitance curve (in mAh/g) as a function of the number of cycles of the composite material D (portion (c) of FIG. 9) and of the composite material 5 (portion (d) of FIG. 9).

FIG. 9 clearly shows a good stability of the cycling when the active material is prepared from the composite material obtained according to the method of the invention.

Example 5

Preparation of a Composite Material 6 of the VPO$_4$/C Formula According to the Invention According to the Invention 4.04 g of vanadium oxide (V$_2$O$_5$), 5.12 g of phosphoric acid (Na$_3$PO$_4$) and 2 g of agar in a beaker with 50 ml of distilled water.

The resulting mixture was heated to 80° C. with magnetic stirring for 12 h to evaporate the water. The resulting residue was heated to 890° C. for 1 h in a quartz tube under an argon atmosphere.

The tube was then cooled to room temperature using water.

Figure 10:
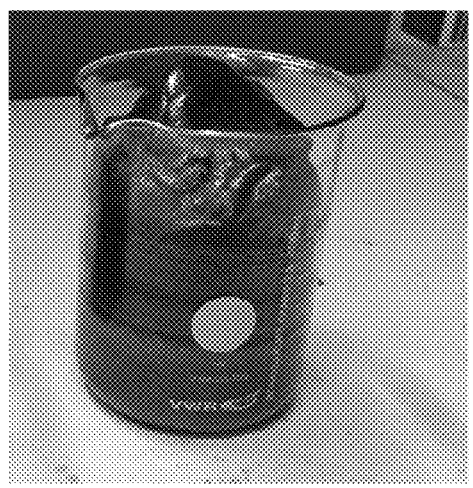
FIG. 10 shows photographs of the residue obtained during the temperature rise in Examples 1 and 2 (FIG. 10a) and the residue obtained during the rise in temperature in Example 5 (FIG. 10b).
Figure 10:
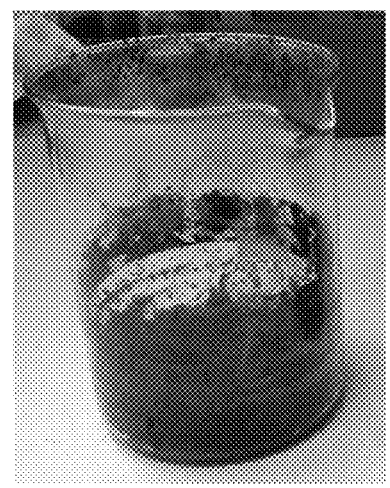

The use of the agar-agar makes it possible at the same time to overcome the evolution of gas generated by the decomposition of the compound comprising at least one carboxylic acid function (compound A$_1$) and the precursor of carbon (compound B) if it exists. used in Examples 1 and 2 when in contact with phosphoric acid; and to limit the volume expansion of the mixture observed during the rise in temperature to 890° C. as shown in FIG. 10 (portion (a) of FIG. 10: residue obtained during the temperature rise in Examples 1 and 2; portion (b) of FIG. 10: residue obtained during the rise in temperature in Example 5).

The composite material 6 obtained in the form of a powder was analyzed by X-ray diffraction (XRD) using an apparatus as described in Example 1. The samples were scanned between 16 and 50° 2θ.

The X-ray diffraction pattern of the composite material 6 of the formula VPO$_4$/C was similar to that obtained for the composite material of Example 1 (see FIG. 1).

The TEM image of the composite material 6 of the formula VPO$_4$/C was similar to that obtained for the composite material of Example 1 (see FIG. 2).

The amount of carbon in the composite material 6 of formula VPO$_4$/C was analyzed by ATG as in Example 1. It was about 5% by weight, based on the total mass of material.

Example 7

Preparation of a Composite Material 7 of Formula VPO$_4$/C According to the Process According to the Invention 4.04 g of vanadium oxide (V$_2$O$_5$), 5.12 g of phosphoric acid (H$_3$PO$_4$), 5.4 g of citric acid and 0.8 g of agar-agar were mixed in a beaker with 30 ml of distilled water.

The resulting mixture was heated to 85° C. with magnetic stirring for 12 h to evaporate the water. The resulting residue was heated to 890° C. for 1 h in a quartz tube under an argon atmosphere.

The tube was then cooled to room temperature using water.

The composite material 7 obtained in the form of a powder was analyzed by X-ray diffraction (XRD) using an apparatus as described in Example 1. The samples were scanned between 16 and 50° 2θ.

The X-ray diffraction pattern of the composite material 7 of the formula VPO$_4$/C was similar to that obtained for the composite material of Example 1 (see FIG. 1).

The TEM image of the composite material 7 of the formula VPO$_4$/C was similar to that obtained for the composite material of Example 1 (see FIG. 2).

The amount of carbon in the composite material 7 of formula VPO$_4$/C was analyzed by ATG as in Example 1. It was about 5% by weight, based on the total mass of composite material.

What is claimed is:

1. Process for the preparation of a vanadium phosphate-carbon composite material corresponding to the formula VPO$_4$/C, comprising the following steps:
   i) mixing a vanadium precursor, H$_3$PO$_4$, a compound A selected from a compound comprising at least one carboxylic acid function and a polysaccharide compound in an aqueous solvent, it being understood that the mixture further comprises a carbon precursor compound when the compound comprising at least one carboxylic acid function is not a carbon precursor,
   ii) heating the mixture of step i) to a temperature of 35° C. to 100° C., to form a solid residue, and
   iii) heating the solid residue to a temperature above 850° C.

2. Process according to claim 1, wherein the vanadium precursor is V$_2$O$_5$.

3. Process according to claim 1, wherein the compound comprising at least one carboxylic acid function comprises from 2 to 10 carbon atoms.

4. Process according to claim 1, wherein the compound comprising at least one carboxylic acid function is a saturated carboxylic acid or polycarboxylic acid chosen from oxalic acid, citric acid, glycolic acid, lactic acid, tartaric acid, malic acid, succinic acid, glycolic acid, malonic acid, glutaric acid, adipic acid, isocitric acid, oxalosuccinic acid and tricarballylic acid.

5. Process according to claim 1, wherein the molar ratio of compound comprising at least one carboxylic acid function/vanadium element in the vanadium precursor is comprised between 1 and 2.

6. Process according to claim 1, wherein the carbon precursor compound is chosen from ethylene glycol and glycerol.

7. Process according to claim 1, wherein the molar ratio of carbon precursor compound/vanadium element in the vanadium precursor is comprised between 0.05 and 2.

8. Process according to claim 1, wherein the polysaccharide compound is agar-agar.

9. Process according to claim 1, wherein the mixture of stage i) comprises:
   either citric acid,
   or oxalic acid and ethylene glycol or glycerol,
   or agar-agar.

10. Process according to claim 1, wherein the mixture of step i) further comprises a binder.

11. Process according to claim 10, wherein the binder is agar-agar when the compound comprising at least one carboxylic acid function is used.

12. Process according to claim 1, wherein step iii) lasts at most 8 h.

13. Process according to claim 1, wherein step iii) is carried out at a temperature of between 880° C. and 900° C.

14. Vanadium phosphate-carbon composite material obtained according to a process as defined in claim 1 and that it comprises particles of VPO$_4$ coated with an amorphous carbon layer.

15. A precursor for the preparation of electrochemically-active electrode materials comprising the vanadium phosphate-carbon composite material obtained according to a process as defined in claim 1.

16. An anode active material comprising the vanadium phosphate-carbon composite material obtained according to a process as defined in claim 1.

17. Composite material of formula Na$_3$V$_2$(PO$_4$)$_2$F$_3$/C comprising Na$_3$V$_2$(PO$_4$)$_2$F$_3$ particles coated with an amorphous carbon layer, said material being obtained from a composite material of vanadium phosphate and carbon of formula VPO$_4$/C as defined in claim 14.

18. Composite material of formula Na$_3$V$_2$(PO$_4$)$_2$F$_3$/C comprising Na$_3$V$_2$(PO$_4$)$_2$F$_3$ particles coated with an amorphous carbon layer, said material being obtained according to a process as defined in claim 1 and having the following lattice parameters: a=9.0294(2) Å, b=9.0445(2) Å, c=10.7528(2) Å in the Amam crystalline system.

19. Process for the preparation of a vanadium phosphate-carbon composite material corresponding to the formula VPO$_4$/C, comprising the following steps:
   i) mixing a vanadium precursor, H$_3$PO$_4$, a compound A being agar-agar in an aqueous solvent and an optional carbon precursor,
   ii) heating the mixture of step i) to a temperature of 35° C. to 100° C., to form a solid residue, and
   iii) heating the solid residue to a temperature above 850° C.

20. Process according to claim 19, wherein the vanadium precursor is V$_2$O$_5$.

21. Process according to claim 19, wherein the carbon precursor compound is chosen from ethylene glycol and glycerol.

22. Process according to claim 19, wherein the molar ratio of carbon precursor compound/vanadium element in the vanadium precursor is comprised between 0.05 and 2.

23. Vanadium phosphate-carbon composite material obtained according to a process as defined in claim 19 and that it comprises particles of VPO$_4$ coated with an amorphous carbon layer.

24. A precursor for the preparation of electrochemically-active electrode materials comprising the vanadium phosphate-carbon composite material obtained according to a process as defined in claim 19.

25. An anode active material comprising the vanadium phosphate-carbon composite material obtained according to a process as defined in claim 19.

26. Composite material of formula Na$_3$V$_2$(PO$_4$)$_2$F$_3$/C comprising Na$_3$V$_2$(PO$_4$)$_2$F$_3$ particles coated with an amorphous carbon layer, said material being obtained according to a process as defined in claim 19 and having the following lattice parameters: a=9.0294(2) Å, b=9.0445(2) Å, c=10.7528(2) Å in the Amam crystalline system.

* * * * *